United States Patent
Westbrook

(10) Patent No.: US 6,454,234 B1
(45) Date of Patent: Sep. 24, 2002

(54) APPARATUS FOR SUPPORTING AND RESTRAINING ELECTRONIC VIEWING MONITORS WITHOUT PENETRATING FASTENERS

(76) Inventor: Charles Westbrook, 775 Alta Vista Rd., Montara, CA (US) 94037

( * ) Notice: Subject to any disclaimer, the term of this patent is extended or adjusted under 35 U.S.C. 154(b) by 0 days.

(21) Appl. No.: 10/003,577

(22) Filed: Nov. 14, 2001

(51) Int. Cl.[7] ............................................. A47H 1/10
(52) U.S. Cl. ..................... 248/317; 248/505; 248/917
(58) Field of Search ............................. 248/317, 680, 248/505, 917, 671, 919, 920, 921, 922, 923, 924, 343, 346.5

(56) References Cited

U.S. PATENT DOCUMENTS

| | | | |
|---|---|---|---|
| 3,358,957 A | | 12/1967 | Lindenmuth |
| 4,363,460 A | | 12/1982 | Carroll |
| 4,516,751 A | | 5/1985 | Westbrook |
| 5,007,608 A | | 4/1991 | Carroll, Jr. |
| 5,064,161 A | * | 11/1991 | Anderson .................. 248/317 |
| 5,102,081 A | | 4/1992 | Barchus |
| 5,127,617 A | | 7/1992 | Bergetz |
| 5,131,620 A | * | 7/1992 | Boundy ...................... 248/674 |
| 5,135,197 A | * | 8/1992 | Kelley et al. ............... 248/551 |
| 5,139,223 A | | 8/1992 | Sedighzadeh |
| 5,179,367 A | * | 1/1993 | Shimizu ................. 248/317 X |
| 5,393,025 A | | 2/1995 | Franklin |
| 5,398,901 A | | 3/1995 | Brodmann et al. |
| 5,725,189 A | * | 3/1998 | Landry ..................... 248/205.2 |
| 6,012,694 A | * | 1/2000 | Sullivan, III ................ 248/323 |

* cited by examiner

Primary Examiner—Ramon O. Ramirez
(74) Attorney, Agent, or Firm—Townsend and Townsend and Crew LLP

(57) ABSTRACT

Apparatus for supporting and restraining electronic viewing monitors, such as televisions and medical monitors, comprise a platform and wall bracket, ceiling bracket, or floor bracket for supporting the platform above the floor. A monitor is held onto the platform using a strap mechanism, usually comprising at least two straps which are pivotally attached between the two sides of the platform. The straps hold the monitor forwardly against an upwardly projecting lip, and the monitor is secured without penetrating fasteners. In a preferred embodiment, the upwardly projecting lip comprises a flexible restraining rail which is secured to the forward edge of the platform. The flexible restraining rail can be conformed to the shape of the particular monitor which is to be supported.

15 Claims, 8 Drawing Sheets

APPARATUS FOR SUPPORTING AND RESTRAINING ELECTRONIC VIEWING MONITORS WITHOUT PENETRATING FASTENERS

BACKGROUND OF THE INVENTION

1. Field of the Invention

The present invention relates generally to mechanical support apparatus, and more particularly to apparatus for removably supporting televisions and other electronic video monitors and equipment on platforms without the use of penetrating fasteners.

Systems for table, wall, ceiling, and floor-mounting of televisions and other electronic video monitors are well known. Often, such supporting systems have relied on attaching the television or other video monitor to a generally horizontal platform using screws or other penetrating fasteners. Recently, the Underwriters Laboratories has prohibited the use of penetrating fasteners because of the possibility of high voltage electrical shock and damage to internal device circuitry. The Uniform Building Code (UBC), including the California amendments for earthquake safety (CBC), however, continue to require that such supporting systems for televisions and other monitors successfully hold the monitors even when subjected to the considerable lateral forces resulting from earthquakes. Restraining of mounted video monitors must also withstand forces resulting from tilting of the monitor, building vibrations, accidental collisions with people and other objects, etc. Thus, reliable, robust, and reasonably priced monitor restraint and support systems are required.

For these reasons, it would be desirable to provide alternative and/or improved mechanical systems for supporting and retaining televisions and other electronic video monitors and equipment. Such systems should hold the monitors in place without the need to utilize penetrating fasteners in order to meet the requirements of the Underwrites Laboratories. Moreover, such support systems should meet the requirements of the CBC California UBC with respect with their ability to safely secure the television and monitors during earthquakes and other seismic events. The inventions described hereinafter are able to meet both of these requirements.

2. Description of the Background Art

U.S. Pat. Nos. 5,398,901 and 5,007,608 describe electronic monitor supports having platforms with forward restraining lips. U.S. Pat. Nos. 5,393,025 and 5,139,223, described the use of straps for securing electronic monitors in ceiling and other support systems. See also U.S. Pat. Nos. 4,363,460; 4,516,751; and 5,102,081. U.S. Pat. No. 4,516,751 is assigned to the assignee of the present application and has common inventorship therewith.

SUMMARY OF THE INVENTION

According to the present invention, improved apparatus for supporting and restraining electronic viewing monitors are provided. In a first embodiment of the invention, the apparatus comprises a platform having an upper surface, a lower surface, a forward edge and a pair of sides. An upwardly projecting lip is formed upon at least a portion of the forward edge of the platform, and at least two adjustable straps are pivotally or otherwise flexibly attached to the sides of the platform to extend therebetween. The platform is mounted in an elevated position above the floor, typically using a wall mount bracket, a floor mount stand, or a ceiling mount device. In other embodiments, the platform may be mounted on a table or other shelf surface. The monitor is secured on the upper surface of the platform using the straps which clamp the monitor downwardly and forwardly against the lip. The monitor is held firmly in place on the platform, and there is no need to secure the monitor to the platform using penetrating fasteners, as was typical of the prior art.

In particular, an aspect of the present invention, the two straps comprise buckle attachments which permit clamping and tightening of video monitors having significantly different sizes.

In a second embodiment of the present invention, the apparatus comprises a platform having an upper surface, a lower surface, a forward edge and a pair of sides. Means for strapping the monitor onto the upper surface of the platform are provided, typically a pair of pivotally attached or otherwise flexible straps as previously described. Alternatively, the strapping means could comprise single straps, hook-and-loop fasteners which extend over the top of the television, clamps, cages, or other mechanical holders which releasably hold the monitor downwardly and forwardly onto the platform.

Apparatus of the second embodiment further comprises a flexible restraining rail adjustably attached to the forward edge of the platform. The rail can be adjusted to conform to the contour of the bottom portion of a wide variety of monitors. In particular, it can conform to curved bottom profiles, square bottom profiles, a regular bottom profiles, or other shapes characteristic of commercially available video monitors. Means for elevating the platform are provided, typically as described above for the first embodiment.

In specific aspects of the second embodiment, the flexible restraining rail has a vertical face and a horizontal flange extending from the lower portion of the vertical face. The horizontal flange preferably has gaps which permit bending of the rail about a vertical axis to facilitate conforming the rail to the video monitor. Optionally, the restraining rail may be covered with the resilient material over at least a portion of it's outer surface. Such covering provides protection should people walking beneath the support apparatus accidentally hit their head against the rail.

DETAILED DESCRIPTION OF THE INVENTION

Figure 1:
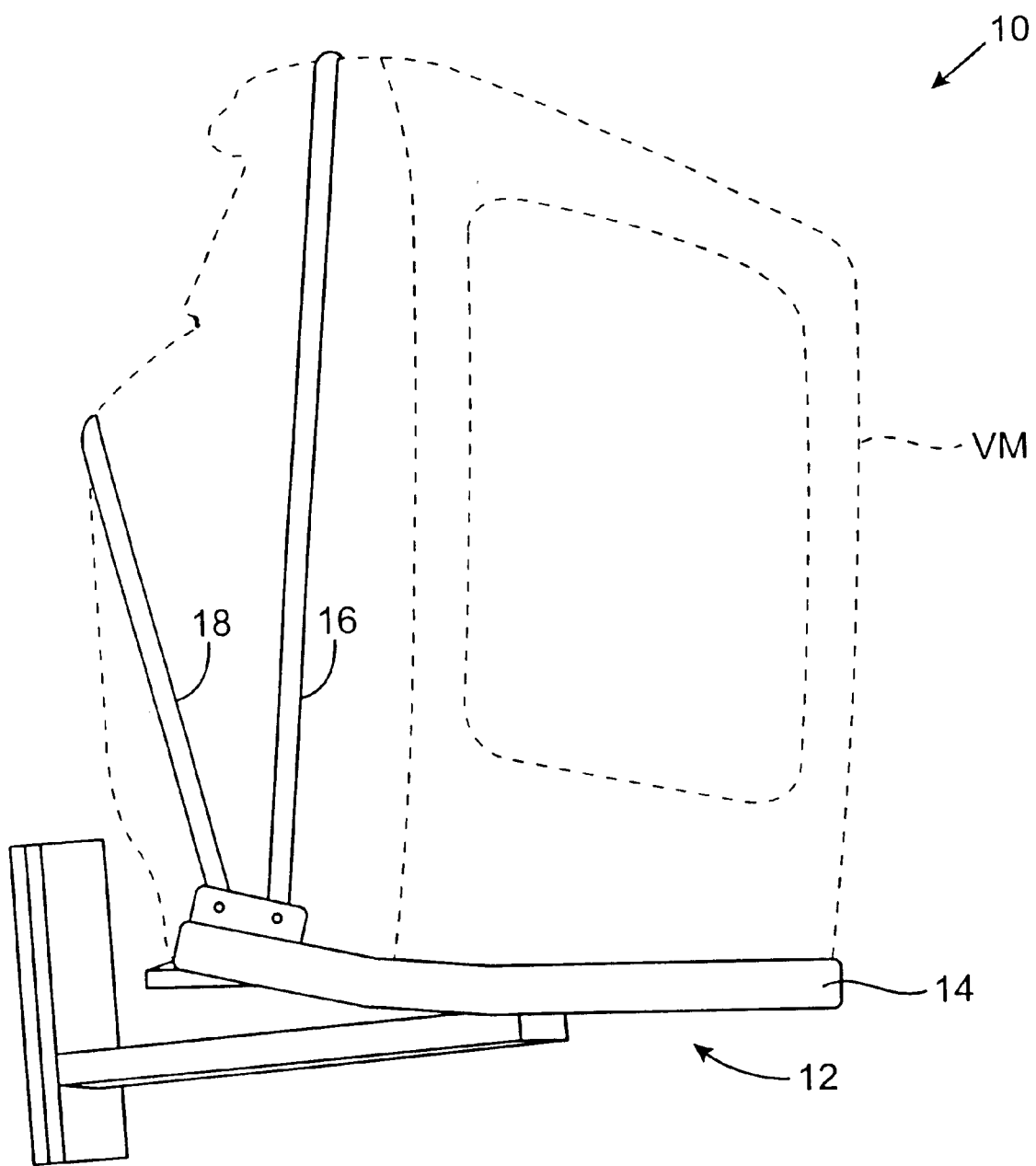
FIG. 1 illustrates the preferred embodiment of the supporting apparatus of the present invention, with an exemplary video monitor shown in broken line.

Referring now to FIG. 1, an exemplary support apparatus for an electronic viewing monitor constructed in accordance with the principals of the present invention will be described. The apparatus 10 comprises a platform 12, a forward restraining rail 14, and a forward strap 18. An electronic viewing monitor VM is placed on an upper surface of the platform 12 so that a lower forward edge of the monitor is disposed against a rear surface of the flexible restraining rail 14. The straps 16 and 18 are secured over the top of the video monitor such that the monitor is held downwardly and forwardly against the rail. Preferably, the rearward strap 18 will be oriented to apply a forward force against the monitor to help hold it in place. The straps 16 and 18 are pivotally or flexibly attached to the platform 12, as will be described in more detail below. The straps 16 and 18 should be adjustable to allow both circumferential conformance to the video monitor as well as tilting or angular movement so that the straps can be placed and tightened over a selected location on the monitor. While a pivoted attachment is illustrated, it will be appreciated that flexible, elastic, or other strap designs could allow the same ability to selectively strap the monitor.

Figure 2:
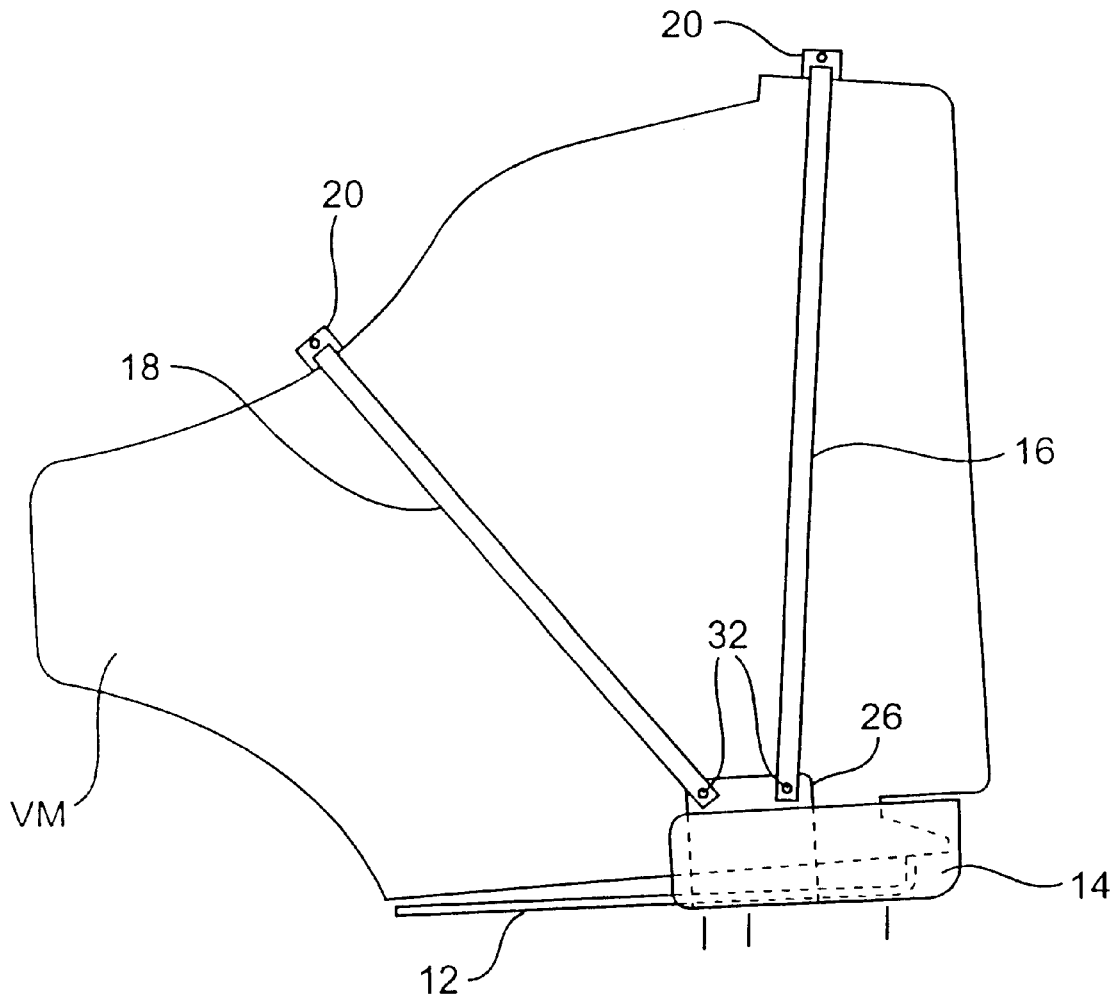
FIG. 2 is a side elevational view of the supporting apparatus of FIG. 1, with the video monitor shown in full line.
Figure 3:
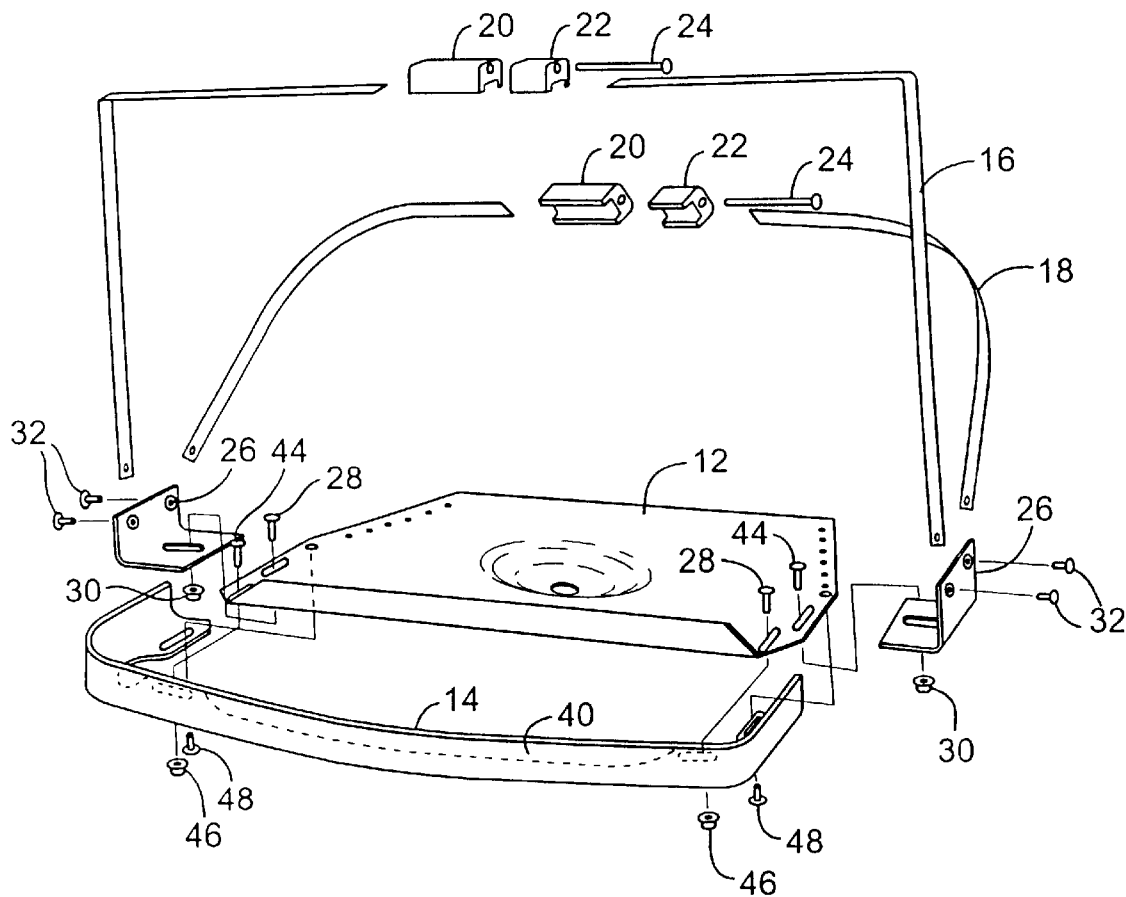
FIG. 3 is an exploded view of the support apparatus of FIGS. 1 and 2.

Referring now to FIGS. 2 and 3, the exemplary support apparatus of the present invention includes the components described above, where the forward straps 16 and rearward strap 18 are held together with buckle attachments comprising a threaded block and strap buckle 20, a tightening block and strap buckle 22 and a strap tightening screw 24. The buckle attachments permit size adjustment and tightening of the straps over viewing monitors having widely different sizes and shapes.

The forward straps 16 and rearward strap 18 are attached to the platform 12 by strap brackets 26. In particular, the strap brackets 26 are connected to the platform by nuts and bolts 28 and 30, respectfully. The straps themselves are pivotally attached to a vertical flange of the brackets 26 by strap attachment screws 32.

Figure 4:
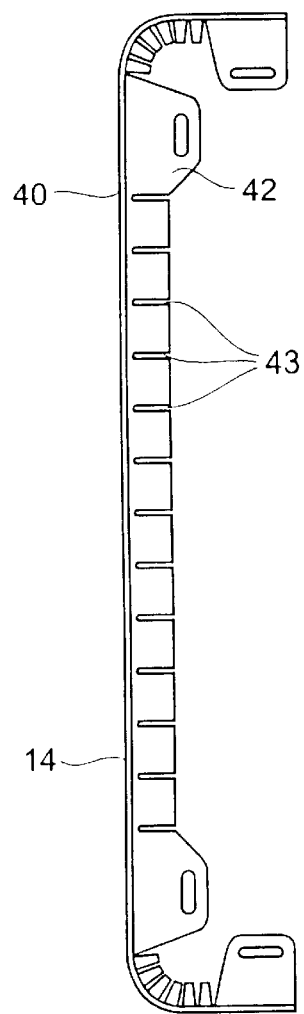
FIG. 4 is a top plan view of the restraining rail of the video support apparatus of the present invention, as shown in it's straight (non-conformed) configuration.
Figure 5:
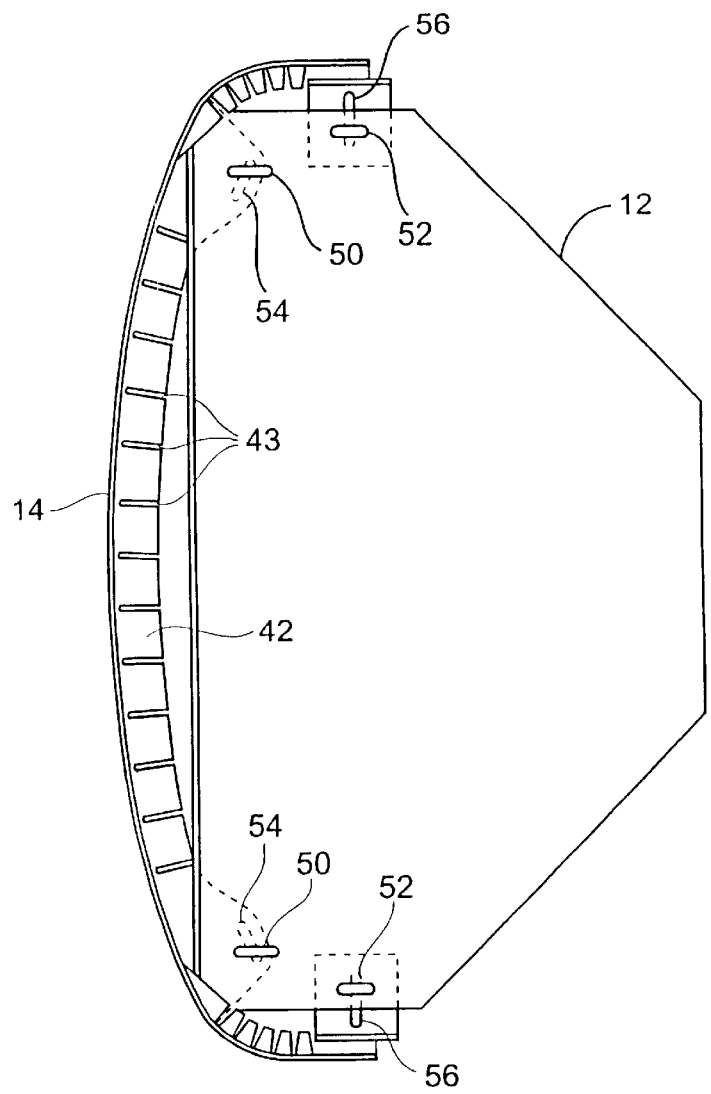
FIG. 5 is a top plan view of the restraining rail of FIG. 4, shown attached to the platform with a curved configuration suitable for video monitors having curved bottom profiles.

Referring now to FIGS. 3–5, the flexible restraining rail 14 comprises a vertical face 40 and a horizontal flange portion 42. The horizontal flange portion 42 includes a plurality of spaced-part gaps 43, notches, or the like which permit bending of the rail to conform to the monitor being mounted on the platform, as best shown in FIG. 5, where the gaps particularly close to accommodate the bending. Attachment of the rail 14 using nuts 44, bolts 46, and screws 48 permits the adjustable mounting of the rail onto the platform 12. In particular, the size and geometry of the rail may be varied by adjusting the relative positions of the rail in the platform using the slots 50 and 52 formed in the platform and slots 54 and 56 in the horizontal flange 42.

Figure 6:
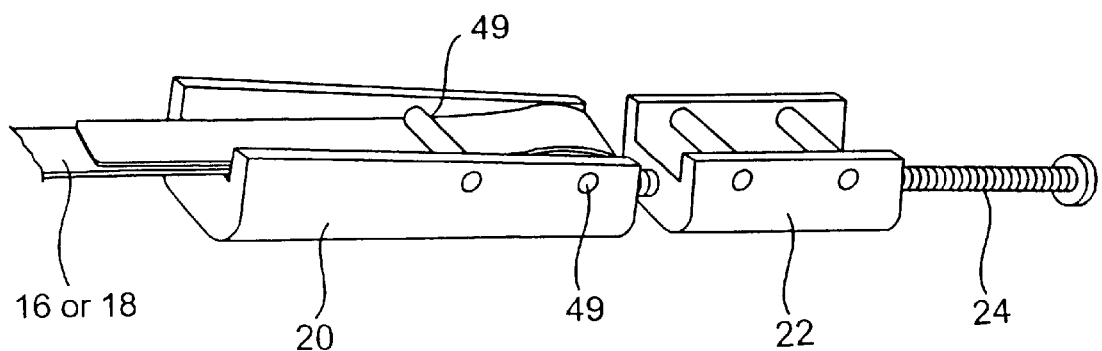
FIG. 6 illustrates a preferred attachment buckle for the straps of the apparatus of FIGS. 1–3.

The detailed construction of an exemplary attachment buckle is shown in FIG. 6. The end of one half of the strap 16 or 18 is threaded through a channel in strap buckle 20 and pulled back over a pair of pins 49 as shown. The other end of the half of strap 16 or 18 is threaded through the tightening block and strap buckle 22 in a similar fashion. The two blocks 20 and 22 may then be secured together using the tightening screw 24. Thus, the desired length of the straps 16 or 18 can first be adjusted by pulling on the ends of the strap halves in order to get the general appropriate size adjustment. The strap may then be tightened onto the monitor using the tightening screw 24 to make sure that the monitor remains firmly in place.

Figure 7:
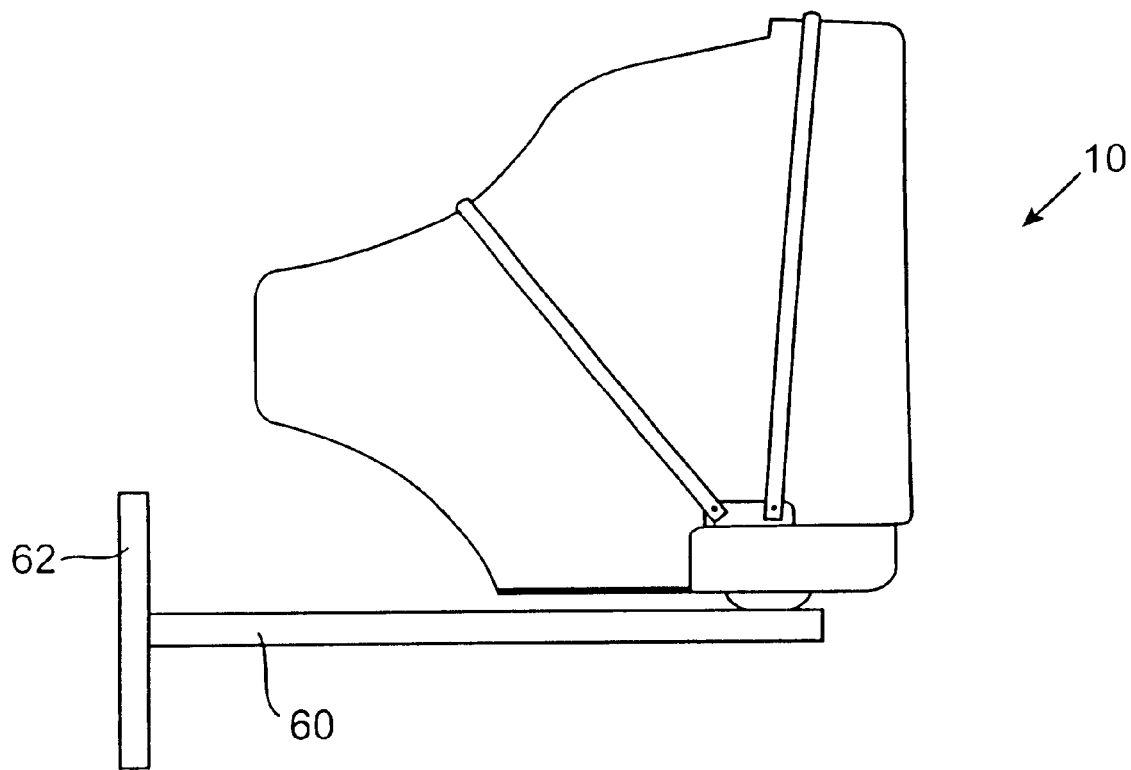
FIGS. 7–9 illustrates alternative elevating apparatus for the support apparatus of the present invention.
Figure 8:
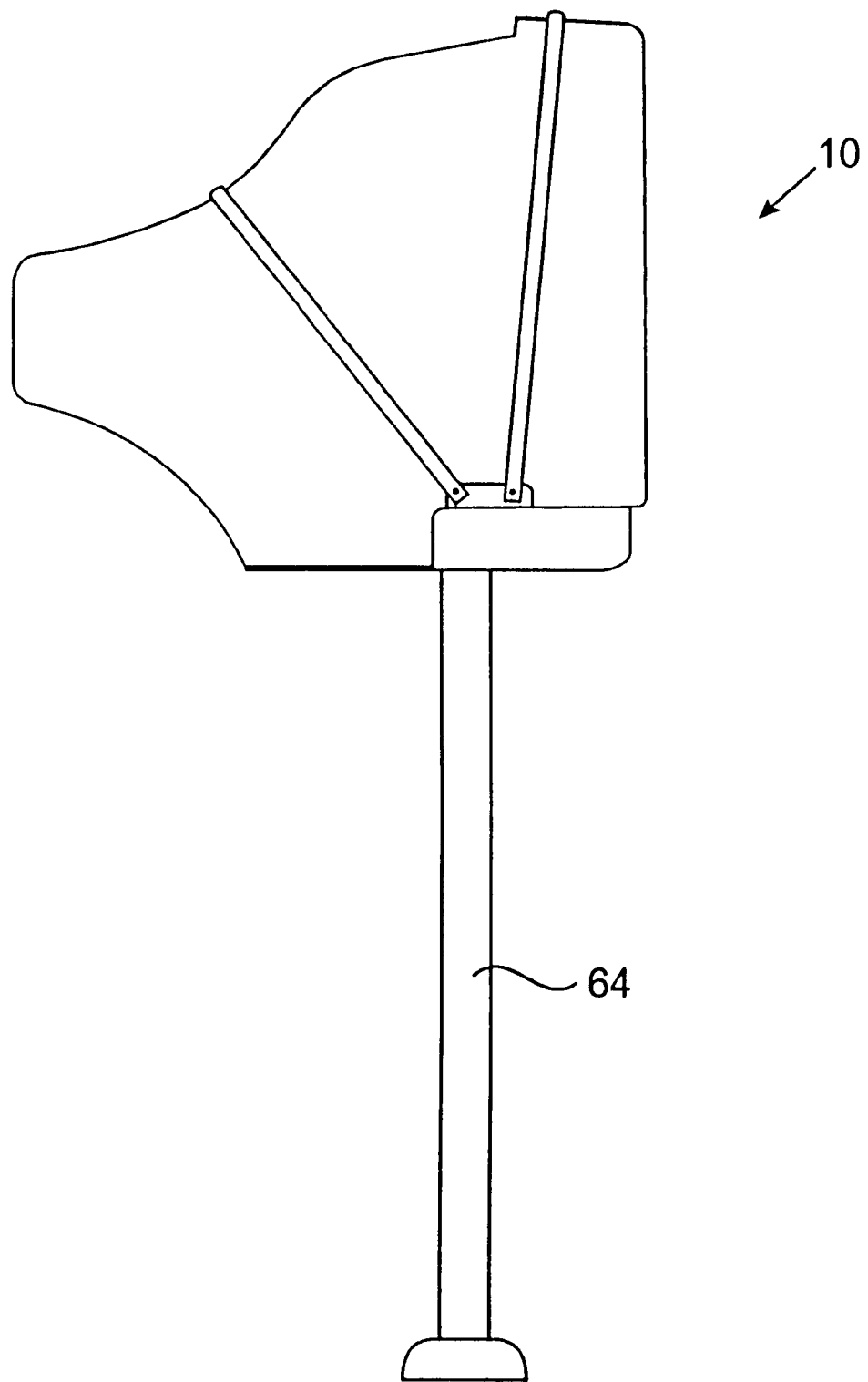
Figure 9:
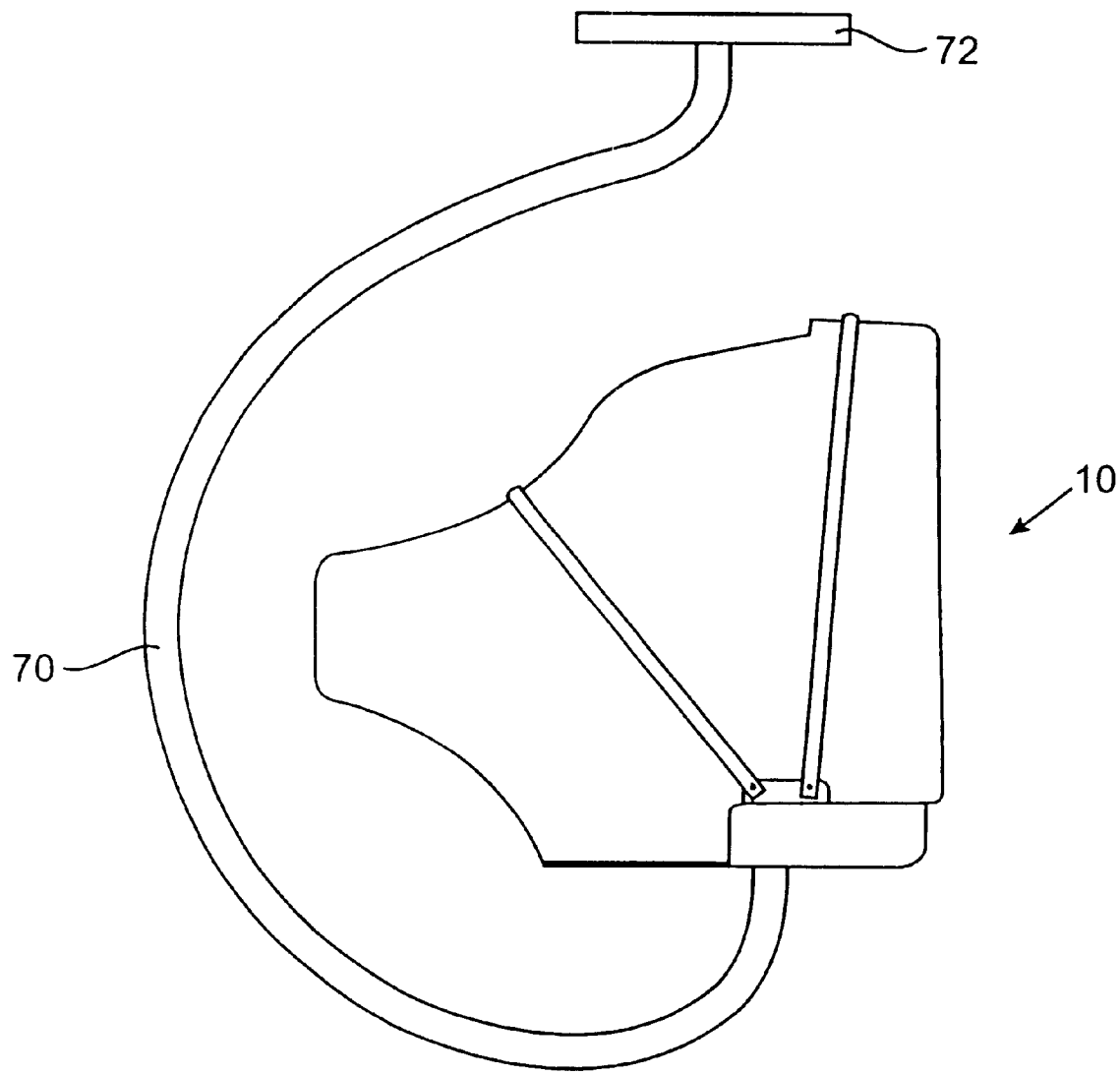

Referring now to FIGS. 7–9, various mounting approaches for the support platform will be described. In FIG. 7, the support apparatus 10 is mounted on a wall bracket comprising a horizontal arm 60 and a wall mounting base 62. An exemplary wall bracket is described in U.S. Pat. No. 4,516,751, assigned to the assignee of the present application, the full disclosure of which is incorporated herein by reference. The apparatus 10 need not be mounted on the wall. As an alternative, it can be mounted on a floor or pedestal 64 as illustrated in FIG. 8. As a third alternative, the apparatus 10 can be mounted on a ceiling bracket comprising a C-shaped support arm 70 which is secured to the ceiling through a base plate 72. Additionally, the apparatus 10 could be configured for mounting or placement on a fixed surface, such as a shelf or table.

What is claimed is:

1. Apparatus for supporting and restraining an electronic viewing monitor, said apparatus comprising:
   a platform having an upper surface, a lower surface, a forward edge, and a pair of sides;
   an upwardly projecting rail along at least a portion of the forward edge of the platform;
   at least two straps;
   means for securing the straps between two sides of the platform; and
   means for elevating the platform above the floor;
   wherein the monitor is secured without penetrating fasteners on the upper surface of the platform with the straps clamping the monitor downwardly and forwardly against the rail to hold the monitor firmly in place on the platform.

2. Apparatus as in claim 1, wherein the means for elevating comprises a wall bracket.

3. Apparatus as in claim 1, wherein the means for elevating comprises a ceiling bracket.

4. Apparatus as in claim 1, wherein the means for elevating comprises a floor stand, table, or shelf.

5. Apparatus as in claim 1, wherein the at least two straps comprise buckle attachments which permit tightening over the video monitor.

6. Apparatus as in claim 1 wherein the straps are pivotally attached relative to the platform.

7. Apparatus as in claim 1, wherein the straps are flexible to allow tilting relative to the platform.

8. Apparatus for removing supporting an electronic viewing monitor, said apparatus comprising;
   a platform having an upper surface, a lower surface, a forward edge, and a pair of sides;
   means for strapping the monitor onto the upper surface of the platform;
   means for securing the strapping means to the platform.
   a flexible restraining rail adjustably attached to the forward edge of the platform, wherein said rail can be adjusted to conform to the contour of a bottom portion of the monitor; and
   means for elevating the platform above a floor.

9. Apparatus as in claim 8, wherein the means for elevating comprises a wall bracket.

10. Apparatus as in claim 8, wherein the means for elevating comprises a ceiling bracket.

11. Apparatus as in claim 8, wherein the means for elevating comprises a floor stand, table, or shelf.

12. Apparatus as in claim 8, wherein the flexible restraining-rail has vertical face and a horizontal flange, wherein the horizontal flange has gaps which permit bending about the vertical axis.

13. Apparatus as in claim 12, wherein the restraining rail is covered with a resilient material over at least a portion of its outside surface.

14. Apparatus as in claim 8, wherein the strapping means comprises at least two straps pivotally attached relative the two sides of the platform.

15. Apparatus as in claim 8, wherein the strapping means comprises at least two straps, wherein the straps are sufficiently flexible to allow tilting relative to the platform.

* * * * *